United States Patent
Li

(10) Patent No.: US 11,401,842 B2
(45) Date of Patent: Aug. 2, 2022

(54) CAMSHAFT PHASE REGULATOR

(71) Applicant: Schaeffler Technologies AG & Co. KG, Herzogenaurach (DE)

(72) Inventor: Xin Li, Jiangsu (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/312,038

(22) PCT Filed: Dec. 14, 2018

(86) PCT No.: PCT/CN2018/121130
§ 371 (c)(1),
(2) Date: Jun. 9, 2021

(87) PCT Pub. No.: WO2020/118661
PCT Pub. Date: Jun. 18, 2020

(65) Prior Publication Data
US 2022/0025789 A1     Jan. 27, 2022

(51) Int. Cl.
*F01L 1/34* (2006.01)
*F01L 1/344* (2006.01)
*F16K 15/16* (2006.01)

(52) U.S. Cl.
CPC ............ *F01L 1/3442* (2013.01); *F16K 15/16* (2013.01); *F01L 2001/34433* (2013.01)

(58) Field of Classification Search
CPC ........... F01L 1/3442; F01L 2001/34433; F01L 1/34463; F01L 1/34469; F01L 1/34476; F01L 1/34479; F16K 15/16
See application file for complete search history.

(56) References Cited

U.S. PATENT DOCUMENTS

| | | | |
|---|---|---|---|
| 2003/0010303 A1* | 1/2003 | Kanada | F01L 1/3442 123/90.17 |
| 2017/0130619 A1 | 5/2017 | Zschieschang et al. | |
| 2018/0073402 A1 | 3/2018 | Smith | |
| 2018/0135470 A1 | 5/2018 | Nakano et al. | |

FOREIGN PATENT DOCUMENTS

| | | |
|---|---|---|
| CN | 106232950 | 12/2016 |
| CN | 107614839 | 1/2018 |
| DE | 102012201561 | 8/2013 |
| WO | 2014202069 | 12/2012 |
| WO | 2014173399 | 10/2014 |
| WO | 2014204650 | 12/2014 |

* cited by examiner

*Primary Examiner* — Zelalem Eshete
(74) *Attorney, Agent, or Firm* — Volpe Koenig

(57) ABSTRACT

A camshaft phase adjuster, which includes first and second oil holes and a locking pin hole formed in the rotor inner core, the first oil hole connecting an engine fluid passage and the first chamber, the second oil hole connecting the first and second chambers, and the first and second oil holes both passing through the locking pin hole. The locking pin is switchable between first and second positions. A one-way valve is provided at the second oil hole; when the locking pin is in the first position, the first oil hole is unblocked, the one-way valve is switched off and the second oil hole is blocked; and in the second position, the first oil hole is blocked, the one-way valve is switched on, and the second oil hole is unblocked. This allows an intermediate locking function.

20 Claims, 6 Drawing Sheets

CAMSHAFT PHASE REGULATOR

CROSS-REFERENCE TO RELATED APPLICATIONS

This application is the U.S. National Phase of PCT Appln. No. PCT/CN2018/121130, filed Dec. 14, 2018, the entire disclosure of which is incorporated by reference herein.

TECHNICAL FIELD

The present disclosure relates to a camshaft phase adjuster, in particular to a camshaft phase adjuster with an intermediate locking function, and specifically to a camshaft phase adjuster with an intermediate locking function controlled by a one-way valve.

BACKGROUND

Pressurized fluid is supplied to different chambers of the camshaft phase adjuster (hereinafter referred to as the phase adjuster) of a motor vehicle engine to control the circumferential position of the rotor of the phase adjuster relative to the stator. The position of the rotor varies according to the needs of the engine. In certain cases, the rotor is expected to be in the middle position.

The existing technology requires two locking pins to control the flow path of pressurized fluid when implementing the intermediate locking function of the phase adjuster. Such a structure contains more subparts and is more complex.

The German patent publication DE 10 2012 201 561 A1 discloses a method of mounting a one-way valve 30 to a rotor blade 11 of a phase adjuster. Referring to FIG. 1, the one-way valve 30 is fixed to both axial ends of the rotor blades 11 by connecting clasps 301 at its two ends, and the one-way valve 30 covers the rotor 1 in its entire axial length. The one-way valve 30 fixed in place by this fixing method is not suitable for use in conjunction with the locking pin to implement the intermediate locking function of the phase adjuster. In addition, when the one-way valve 30 is switched on, the movable portion 302 is deformed and the stopper 303 is relied to limit the movable portion 302. Under the impact of oil pressure, the fatigue strength at the contact between the movable portion 302 and the stopper 303 decreases greatly, thereby reducing the reliability of the system.

SUMMARY

The object of the present disclosure is to overcome or at least alleviate the above-mentioned deficiencies of the prior art by providing a camshaft phase adjuster capable of implementing the intermediate locking function of the phase adjuster by means of a one-way valve in conjunction with a single locking pin.

A camshaft phase adjuster is provided, comprising a rotor, a stator, a locking pin and a one-way valve;

the stator comprising a stator body in a substantially cylindrical shape and a plurality of protrusions protruding toward a radially inner side of the stator body, the rotor comprising a rotor inner core in a substantially cylindrical shape and a plurality of rotor blades protruding toward a radially outer side of the rotor inner core, the rotor being rotatably mounted in the inner space of the stator body, the plurality of protrusions defining a plurality of inner cavities by fitting with the outer peripheral wall of the rotor inner core, and one of the rotor blades extending into the inner cavities and defining a first chamber and a second chamber in the inner cavities, wherein, a first oil hole, a second oil hole and a locking pin hole are formed in the rotor inner core, the first oil hole connecting an engine fluid passage and the first chamber, the second oil hole connecting the first chamber and the second chamber, the first oil hole and the second oil hole both passing through the locking pin hole, the locking pin being located in the locking pin hole and capable of switching between a first position and a second position, the one-way valve being provided at the second oil hole, when the locking pin is in the first position, the first oil hole is unblocked, the one-way valve is switched off and the second oil hole is blocked, when the locking pin is in the second position, the first oil hole is blocked by the locking pin, the one-way valve is switched on, and the second oil hole is unblocked.

In at least one embodiment, a valve mounting groove is formed in the outer periphery of the rotor inner core, the valve mounting groove connecting to the second oil hole, and the one-way valve being housed in the valve mounting groove.

In at least one embodiment, the one-way valve comprises a valve plate and a valve seat, the valve plate being installed in the valve mounting groove within a certain range of deformation, the valve seat being fixedly mounted in the valve mounting groove, and the valve seat being located on a radially outer side of the valve plate and limiting the valve plate in a radial direction of the rotor inner core.

In at least one embodiment, the valve mounting groove comprises a groove bottom surface extending along an axial direction of the rotor inner core and substantially perpendicular to a radial direction of the rotor inner core, two groove side surfaces located on either side of the groove bottom surface and extending along an axial direction of the rotor inner core, and an axial groove positioning surface, which is located between the first oil hole and the second oil hole in an axial direction of the rotor inner core.

In at least one embodiment, the valve plate comprises a fixed portion and a movable portion, one end of the movable portion being connected to the fixed portion and the other end of the movable portion being a stop-flow portion, which blocks the second oil hole by blocking an opening of the second oil hole at the groove bottom surface when the movable portion fits onto the groove bottom surface.

In at least one embodiment, the two groove side surfaces are inclined relative to a radial direction of the rotor inner core. The closer to a radially outer side, the smaller a distance between the two groove side surfaces.

In at least one embodiment, the valve seat comprises an outer frame, a portion of the surface of the outer frame forming a surface contact with the groove side surface of the valve mounting groove when the valve seat is installed into the valve mounting groove.

In at least one embodiment, the valve seat further comprises an intermediate stop portion partially separated from the outer frame, the intermediate stop portion having a spacing formed between a first stop portion surface near the valve plate and the groove bottom surface when the valve seat is installed into the valve mounting groove, the spacing providing space for deformation movement of the valve plate.

In at least one embodiment, the first stop portion surface is a circular arc surface, the spacing being greater the closer to the second oil hole in the axial direction it is.

In at least one embodiment, when the valve seat is installed into the valve mounting groove, the intermediate stop portion of the valve seat is projected in substantially the same shape as the movable portion of the valve plate in a plane perpendicular to a radial direction of the rotor inner core.

Figure 1:
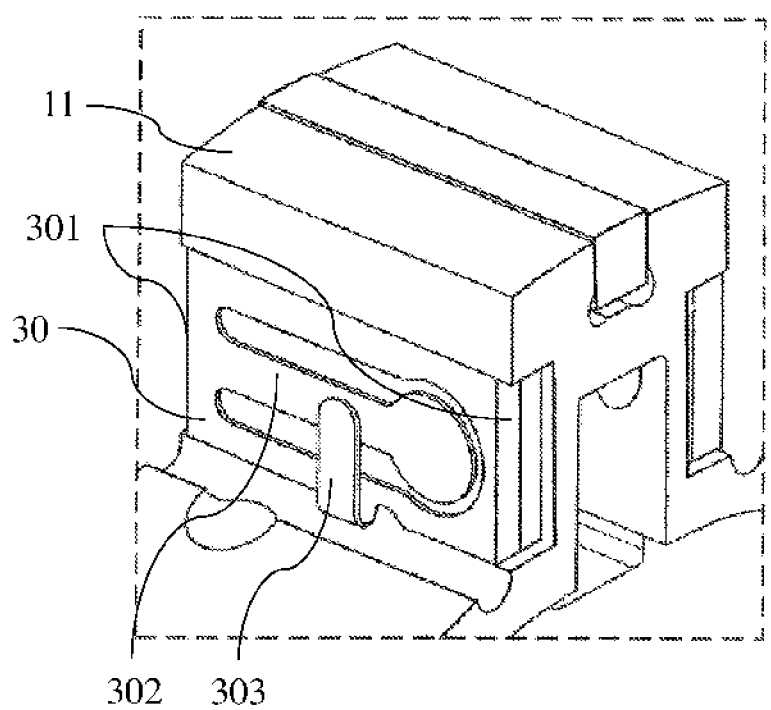
FIG. 1 shows a schematic diagram of a structure that fixes a one-way valve to a phase adjuster in the prior art.

DESCRIPTION OF REFERENCE NUMERALS 1 rotor; 10 rotor inner core; 11 rotor blades; 12 locking pin hole; 13 valve mounting groove; 131 groove bottom surface; 132 groove side surfaces; 133 axial groove positioning surface; 2 stator; 20 stator body; 21 protrusions; 3, 30 one-way valve; 301 connecting clasps; 31 valve plate; 311 fixed portion; 302, 312 movable portion; 3121 stop-flow portion; 32 valve seat; 321 outer frame; 3211 valve seat side surface; 3212 axial valve seat positioning surface; 322 intermediate stop portion; 303, 3220 stop head; 3221 first stop portion surface; 3222 second stop portion surface; 323 drain holes; 4 locking pin; P first oil hole; M second oil hole; A first chamber; B second chamber; 5 inner cavities.

DETAILED DESCRIPTION

Exemplary implementations of the present disclosure will be described below with reference to the drawings. It should be understood that these specific descriptions are only used to teach those skilled in the art how to implement the present disclosure, and are not intended to be exhaustive of all possible variations of the present disclosure, nor to limit the scope of the present disclosure.

Exemplary implementations will be described below with reference to FIGS. 2-9.

Figure 2:
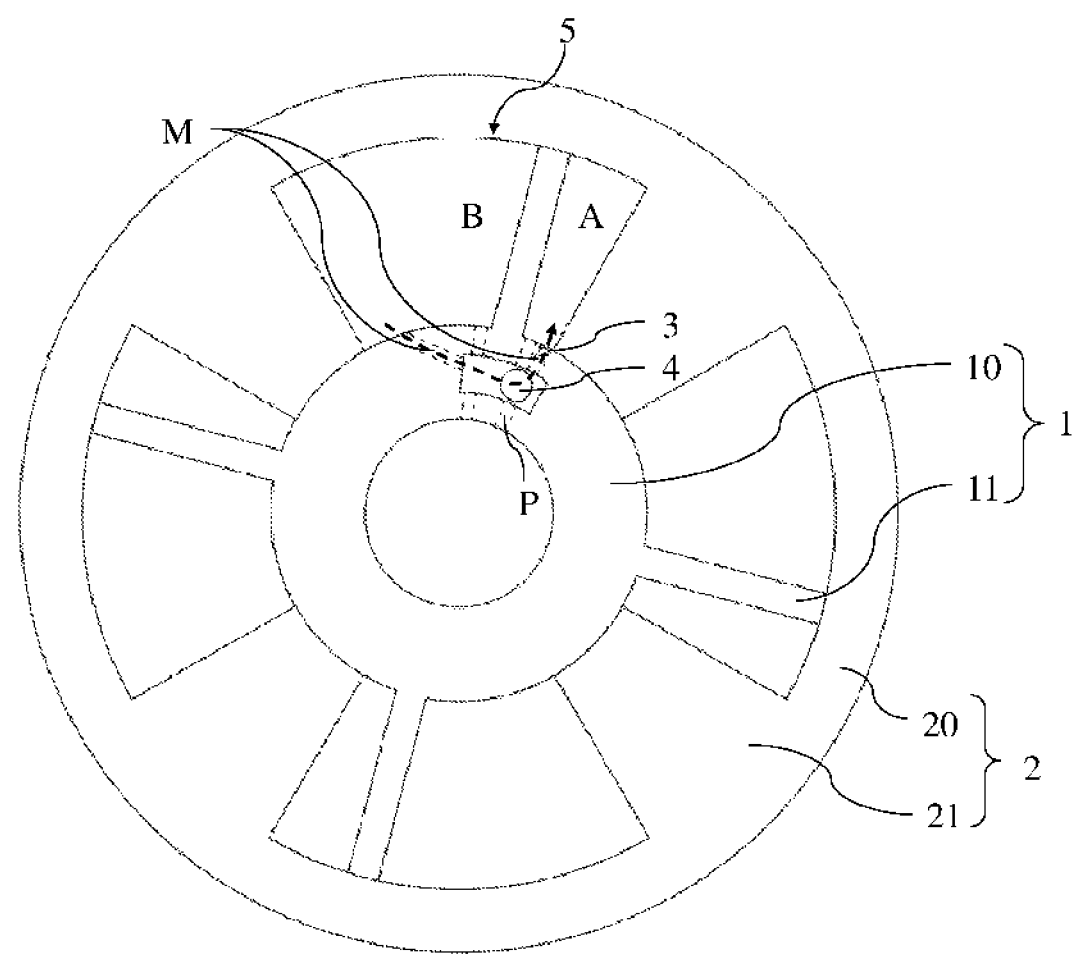
FIG. 2 and FIG. 3 are schematic diagrams of a one-way valve in conjunction with a locking pin for fluid regulation of a phase adjuster according to the present disclosure.
Figure 3:
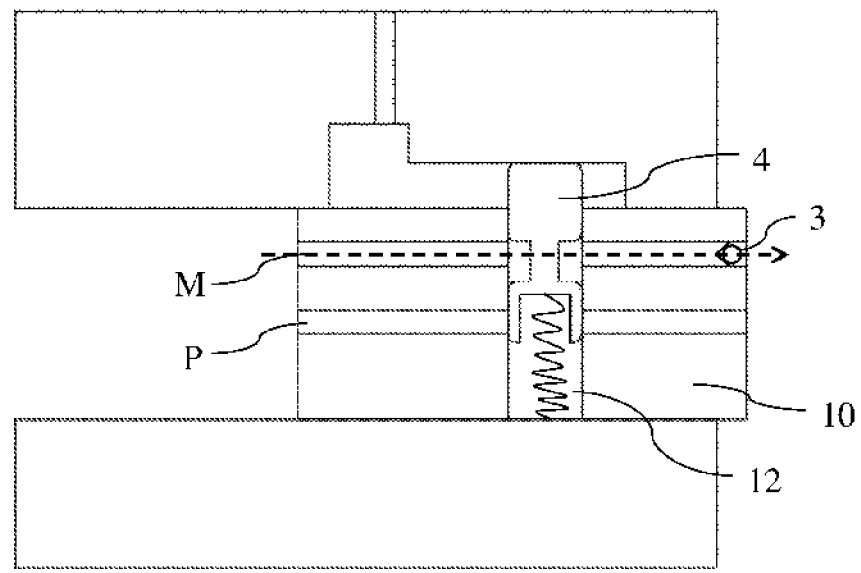

FIGS. 2-3 show schematic diagrams of implementation of an intermediate locking function of a camshaft phase adjuster by means of a locking pin 4 in conjunction with a one-way valve 3 according to an embodiment of the present disclosure.

The phase adjuster comprises a rotor 1 and a stator 2. The stator body 20 of the stator 2 is in a cylindrical shape with four protrusions 21 protruding radially inward from the inner wall of the stator body 20. The outer wall of the cylindrical rotor inner core 10 of the rotor 1 rotatably and sealedly fits with the protrusions 21, which separate the space between the assembled rotor 1 and stator 2 (more precisely, between the rotor inner core 10 and the stator body 20) into four inner cavities 5. The outer wall of the rotor inner core 10 has four rotor blades 11 protruding radially outward, each rotor blade 11 correspondingly extending into an inner cavity 5 and rotatably and sealingly fitting with the inner wall of the inner cavity 5. The flow path of the fluid (also referred to hereinafter as oil) in one of the four inner cavities 5 is regulated by a one-way valve 3, and the rotor blades 11 separate this inner cavity 5 into a first chamber A and a second chamber B. It should be understood that the number of inner cavities 5, the corresponding numbers of protrusions 21 and rotor blades 11 may be set as desired, and are not limited by the present disclosure.

The rotor inner core 10 is provided with a first oil hole P and a second oil hole M. The first oil hole P connects the engine to the first chamber A and passes through the locking pin hole 12, and the second oil hole M connects the first chamber A to the second chamber B and passes through the locking pin hole 12. The locking pin hole 12 is provided in the axial direction in the rotor inner core 10. In the connecting path of the second oil hole M, a one-way valve 3 is provided; and in the locking pin hole 12, a locking pin 4 is provided. When the locking pin 4 is in the first position, the one-way valve 3 is switched off and the oil flows into the first chamber A through the first oil hole P; when the locking pin 4 is in the second position (corresponding to the state shown in FIGS. 2 and 3), the oil in the second chamber B flows through the locking pin 4 from the second oil hole M, the one-way valve 3 is switched on under the action of oil pressure and the oil from the second chamber B further flows into the first chamber A. The flow directions of the oil are shown by the dashed arrows in FIG. 2 and FIG. 3, and the phase adjuster moves toward the middle position.

Figure 4:
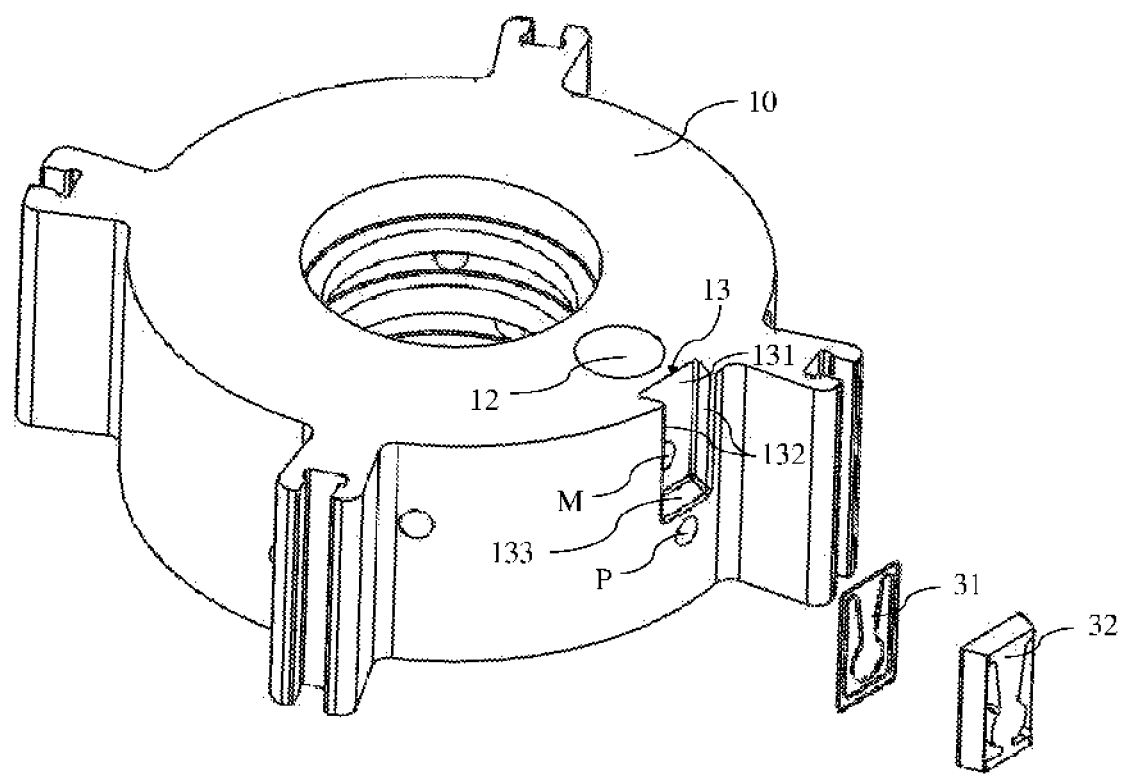
FIG. 4 is an exploded schematic diagram of a rotor and a one-way valve of a phase adjuster according to an embodiment of the present disclosure.

Referring to FIG. 4, a valve mounting groove 13 for fixing the one-way valve 3 is provided in the radially outer portion (i.e., the outer periphery) of the rotor inner core 10. The length of the valve mounting groove 13 in the axial direction of the rotor inner core 10 is such that, in the axial direction, the valve mounting groove 13 covers the connecting path of the second oil hole M but not the connecting path of the first oil hole P, i.e., the axial groove positioning surface 133 is located between the second oil hole M and the first oil hole P in the axial direction. The valve mounting groove 13 has a cross-section in the shape of a substantially trapezoidal opening perpendicular to the axial direction; if the distance between the two groove side surfaces 132 of the valve mounting groove 13 extending along the axial direction of the rotor inner core 10 is defined as the groove width, then, in the radial direction of the rotor inner core 10, the groove width of the valve mounting groove 13 on the radially outer side is smaller than the groove width of it on the radially inner side. The advantage of having the two groove side surfaces 132 set as inclined at an angle to each other will be further demonstrated in the following description of the assembly and positioning of the valve seat 32 and the valve mounting groove 13. Preferably, the rotor 1 is molded by a powder metallurgical process.

The specific structure of the one-way valve 3 and the way it is set on the rotor inner core 10 are described in detail below with reference to FIGS. 5-7.

The one-way valve 3 comprises a valve plate 31 and a valve seat 32.

Figure 5:
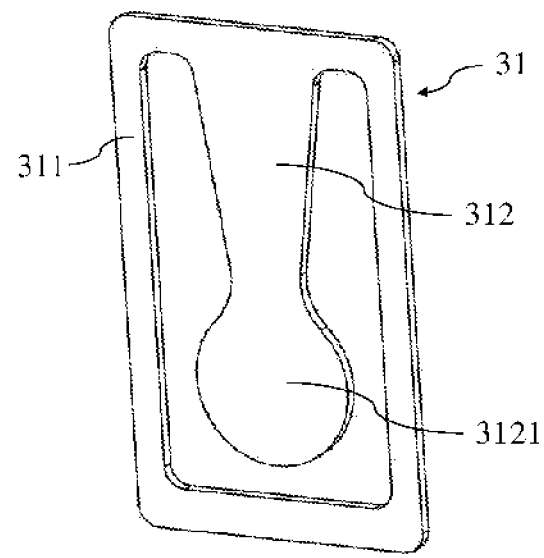
FIG. 5 is a schematic diagram of a valve plate of a phase adjuster according to an embodiment of the present disclosure.

Referring to FIG. 5, the valve plate 31 is in the shape of a flat sheet, and the valve plate 31 comprises a fixed portion 311 in the shape of a substantially rectangular ring located at the outer edge, and a movable portion 312 having one end connected to the fixed portion 311 and the other end overhung and enclosed in the fixed portion 311, the overhung end of the movable portion 312 being a stop-flow portion 3121. The outer edge of the fixed portion 311 is in substantially the same shape as the outer edge of the groove bottom surface 131, and the valve plate 31 can be inserted into the valve mounting groove 13 and fit well with the groove bottom surface 131. When subjected to an external force (i.e., oil pressure from the radially inner side), the movable portion 312 is able to deform to a certain extent relative to the fixed portion 311, which is manifested as the buckling of the stop-flow portion 3121 from the plane in which the fixed portion 311 is located. The stop-flow portion 3121 is in a substantially circular shape and has a diameter slightly larger than the diameter of the second oil hole M. However, this is not limited by the present disclosure. When the valve plate 31 is installed into the valve mounting groove 13, the stop-flow portion 3121 completely covers the opening of the second oil hole M in the groove bottom surface 131.

Figure 6:
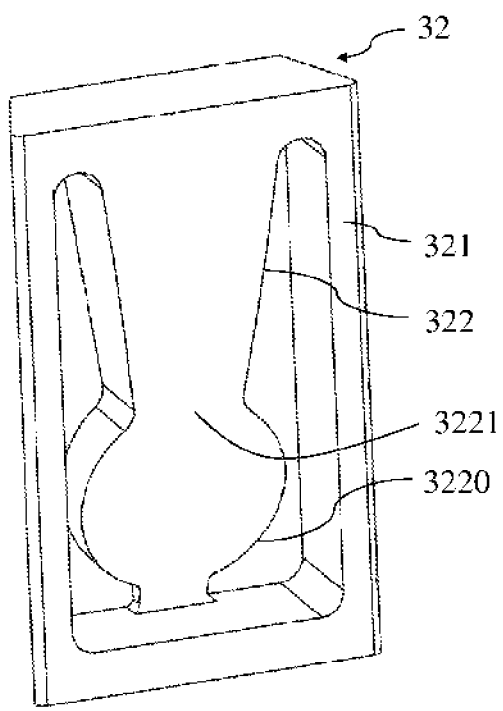
FIG. 6 and FIG. 7 are schematic diagrams of a valve seat of a phase adjuster according to an embodiment of the present disclosure.
Figure 7:
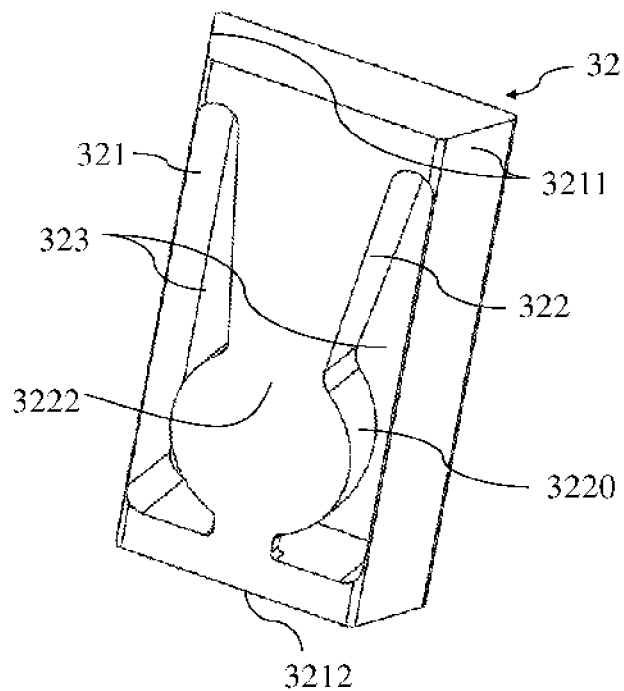

Referring to FIGS. 6-7, the valve seat 32 includes an outer frame 321 and an intermediate stop portion 322. The dimensions of the outer edge of the valve seat 32 are substantially adapted to the dimensions of the valve mounting groove 13, and the two valve seat side surfaces 3211 of the outer frame 321 are set as inclined at an angle to each other to fit the groove side surfaces 132 of the valve mounting groove 13, so that the valve seat 32 can be inserted and well positioned in the valve mounting groove 13. The positioning of the valve seat 32 in the valve mounting groove 13 is manifested as circumferential positioning, radial positioning and axial positioning, wherein the two valve seat side surfaces 3211 form a relatively stable surface contact with the two groove side surfaces 132, simultaneously achieving the above-mentioned circumferential positioning and radial positioning; the axial valve seat positioning surface 3212 forms a relatively stable surface contact with the axial groove positioning surface 133, achieving the above-mentioned axial positioning.

The intermediate stop portion 322 is similar in shape to the movable portion 312 of the valve plate 31, and preferably, the valve seat 32 has a stop head 3220 at a location corresponding to the stop-flow portion 3121 of the valve plate 31, the stop head 3220 being in a substantially circular shape and having a diameter equal to or slightly larger than the diameter of the stop-flow portion 3121. Two drain holes 323 are provided between the two sides of the intermediate stop portion 322 and the outer frame 321. The first stop portion surface 3221 is inclined relative to the second stop portion surface 3222, and referring to FIG. 6, the closer the intermediate stop portion 322 is to the stop head 3220, the less its thickness is; preferably, the first stop portion surface 3221 is a substantially circular arc surface.

Preferably, both the rotor 1 and the valve seat 32 are made by a powder molding process. Preferably, the valve mounting groove 13 on the rotor 1 is molded at the same time as the rotor 1 is molded, without the need to machine the rotor 1 after it has been molded. Preferably, the first stop portion surface 3221 in the shape of a substantially circular arc surface and the two valve seat side surfaces 3211 of the valve seat 32 are molded at the same time as the valve seat 32 is molded, without the need to machine the valve seat 32 after the valve seat 32 is formed. The two molded valve seat side surfaces 3211 match the two groove side surfaces 132 of the valve mounting groove 13, and the axial valve seat positioning surface 3212 matches the axial groove positioning surface 133. However, the present disclosure does not limit the composition material and processing process of the valve seat 32. For example, the composition material of the valve seat 32 can be materials other than metal powder, for example, plastic.

After the one-way valve 3 is mounted to the rotor 1, the valve plate 31 is stacked on the side of the valve seat 32 where the first stop portion surface 3221 is located, the stop-flow portion 3121 overlaps the stop head 3220, the one-way valve 3 is housed in the valve mounting groove 13 with the valve plate 31 inside and the valve seat 32 outside, and the stop-flow portion 3121 shades the second oil hole M. The valve plate 31 is positioned radially by the valve seat 32 from its radially outer side and circumferentially and axially by the valve mounting groove 13, thus achieving definite positioning. Specifically, the positioning location of the valve plate 31 is located at its fixed portion 311. The fact that the first stop portion surface 3221 of the valve seat 32 opposite the valve plate 31 is inclined relative to the circumferential wall of the rotor inner core 10 provides space for the movable portion 312 of the valve plate 31 to deform along the radial direction of the rotor inner core 10, and the deformation of the movable portion 312 provides the possibility of switching on and switching off the one-way valve 3. It is worth noting that, when the one-way valve 3 is switched on, the movable portion 312 bends and deforms toward the first stop portion surface 3221, and the maximum limit for bending and deformation of the movable portion 312 is that the movable portion 312 tightly presses against the first stop portion surface 3221. The curved first stop portion surface 3221 makes the deformation and opening process of the movable portion 312 smooth, so that the valve plate 31 is not prone to damage even under the impact of high oil pressure. After the movable portion 312 bends and deforms and the one-way valve 3 is switched on, the oil can flow through the drain holes 323 of the valve seat 32.

Figure 8:
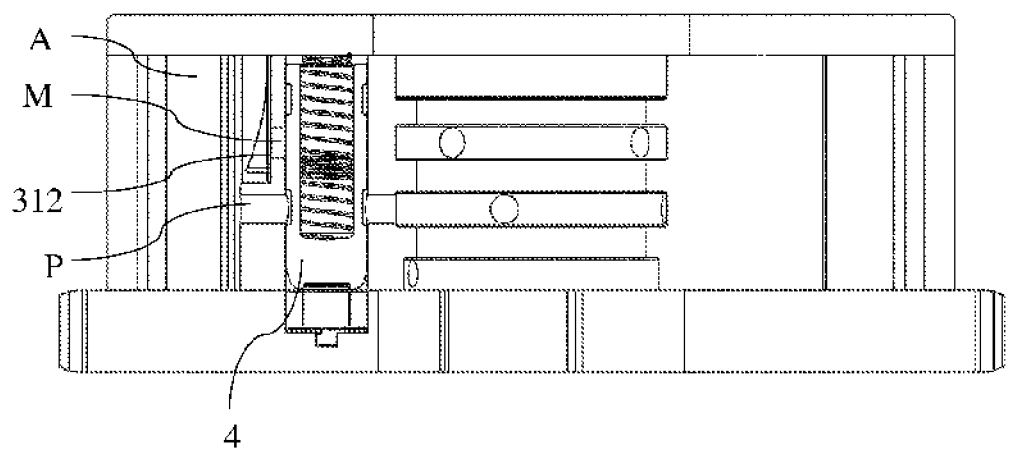
FIG. 8 is an axial cutaway schematic diagram of a phase adjuster according to an embodiment of the present disclosure with the one-way valve in a switched-off state.
Figure 9:
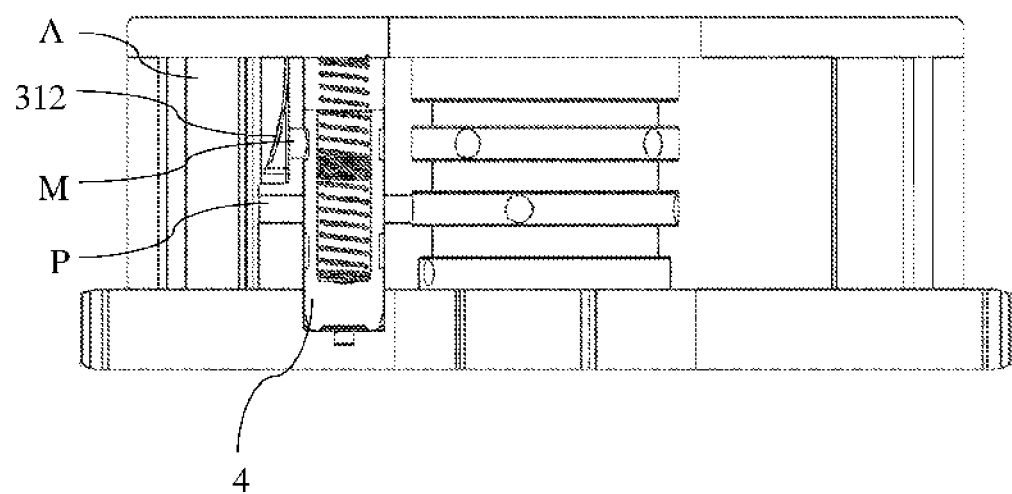
FIG. 9 is an axial cutaway schematic diagram of a phase adjuster according to an embodiment of the present disclosure with the one-way valve in a switched-on state.

Referring to FIGS. 8-9, how the one-way valve 3 works with the locking pin 4 to control the flow direction of oil is described below. For convenience of description, the surface of the valve plate 31 facing toward the valve seat 32 is referred to as the first valve plate surface, and the surface of the valve plate 31 facing away from the valve seat 32 is referred to as the second valve plate surface. In FIG. 8, the locking pin 4 is in the first position, the first oil hole P is unblocked, the oil flows into the first chamber A from the engine through the first oil hole P, the oil pressure on the first valve plate surface is greater than the oil pressure on the second valve plate surface, the one-way valve 3 is in the switched-off state, and its movable portion 312 tightly presses against the groove bottom surface 131, thus blocking the second oil hole M. In FIG. 9, the locking pin 4 is in the second position, the first oil hole P is blocked, the oil temporarily stops flowing into the first chamber A, the oil in the second chamber B flows to the second oil hole M of the locking pin 4, the oil pressure on the second valve plate surface is greater than the oil pressure on the first valve plate surface, the movable portion 312 bends and deforms toward the first stop portion surface 3221, the one-way valve 3 is switched on, the second oil hole M is unblocked, and the oil in the second chamber B flows into the first chamber A through the second oil hole M.

The present disclosure has at least one of the following advantages:

(i) The present disclosure uses a one-way valve 3 in conjunction with a locking pin 4, and only one locking pin 4 is required to implement the intermediate locking function of the camshaft phase adjuster.

(ii) The valve plate 31 and valve seat 32 of the one-way valve 3 according to the present disclosure have a simple structure, a simple molding process and a simple assembly process.

(iii) The fixed portion 311 of the valve plate 31 according to the present disclosure can fit with the valve seat 32 and the valve mounting groove 13, so that the valve plate 31 is positioned in the valve mounting groove 13; in particular, the axial positioning of the one-way valve 3 by the valve mounting groove 13 avoids fixing the one-way valve at both ends of the axial direction with the connecting clasps 301 in the prior art (refer to FIG. 1), and the one-way valve 3 according to the present disclosure, when assembled with the rotor 1, will not interfere with the first oil hole P.

(iv) The valve seat 32 according to the present disclosure not only implements the function of draining oil when the valve plate 31 is open, but also plays the role of controlling the travel of the valve plate 31, and the movable portion 312 of the valve plate 31 in the open state can fit onto the first stop portion surface 3221 of the valve seat 32 to avoid plastic deformation of the valve plate 31.

(v) The first stop portion surface 3221 in the shape of a substantially circular arc surface according to an embodiment of the present disclosure makes the opening process of the valve plate 31 smooth so that the valve plate 31 is not prone to damage even under the impact of high pressure, thereby prolonging the fatigue life of the valve plate 31.

Of course, the present disclosure is not limited to the above implementations, and those skilled in the art can make various modifications to the above implementations of the present disclosure without departing from the scope of the present invention under the teaching of the present disclosure. For example:

(i) The shape of the intermediate stop portion 322 on the valve seat 32 may not be similar to the movable portion 312 of the valve plate 31, and any stop shape that can limit the movable portion 312 in the radial direction is selectable.

(ii) The present disclosure does not limit the number and shape of the drain holes 323 in the valve seat 32.

(iii) The radial cross-section of the valve mounting groove 13 is not limited to a trapezoidal opening, and the valve mounting groove 13 may have a radial cross-section in other shapes to limit the valve seat 32 in the radial and circumferential direction.

The invention claimed is:

1. A camshaft phase adjuster, comprising:
a rotor, a stator, a locking pin and a one-way valve;
the stator comprising a stator body having a substantially cylindrical shape and a plurality of protrusions protruding radially inwardly on an inner side of the stator body,
the rotor comprising a rotor inner core having a substantially cylindrical shape and a plurality of rotor blades protruding toward a radially outer side of the rotor inner core,
the rotor being rotatably mounted in an inner space of the stator body, the plurality of protrusions defining a plurality of inner cavities by fitting with an outer peripheral wall of the rotor inner core, and one of the rotor blades extending into each of the inner cavities and defining a first chamber and a second chamber in the inner cavities,
a first oil hole, a second oil hole and a locking pin hole formed in the rotor inner core, the first oil hole connecting an engine fluid passage and the first chamber, the second oil hole connecting the first chamber and the second chamber, the first oil hole and the second oil hole both passing through the locking pin hole;
the locking pin being located in the locking pin hole and being switchable between a first position and a second position;
a one-way valve provided at the second oil hole;
wherein, when the locking pin is in the first position, the first oil hole is unblocked, the one-way valve is switched off and the second oil hole is blocked, and when the locking pin is in the second position, the first oil hole is blocked by the locking pin, the one-way valve is switched on, and the second oil hole is unblocked.

2. The camshaft phase adjuster according to claim 1, further comprising a valve mounting groove formed in an outer periphery of the rotor inner core, the valve mounting groove connecting to the second oil hole, and the one-way valve being housed in the valve mounting groove.

3. The camshaft phase adjuster according to claim 2, wherein the one-way valve comprises a valve plate and a valve seat, the valve plate being installed in the valve mounting groove within a pre-defined range of deformation, the valve seat being fixedly mounted in the valve mounting groove, and the valve seat being located on a radially outer side of the valve plate and limiting the valve plate in a radial direction of the rotor inner core.

4. The camshaft phase adjuster according to claim 3, wherein the valve mounting groove comprises a groove bottom surface extending along an axial direction of the rotor inner core and substantially perpendicular to the radial direction of the rotor inner core, two groove side surfaces located on either side of the groove bottom surface and extending along the axial direction of the rotor inner core, and an axial groove positioning surface, which is located between the first oil hole and the second oil hole in the axial direction of the rotor inner core.

5. The camshaft phase adjuster according to claim 4, wherein the valve plate comprises a fixed portion and a movable portion, one end of the movable portion being connected to the fixed portion and another end of the movable portion being a stop-flow portion, which is configured to block the second oil hole by blocking an opening of the second oil hole at the groove bottom surface when the movable portion fits onto the groove bottom surface.

6. The camshaft phase adjuster according to claim 5, wherein the two groove side surfaces are inclined relative to the radial direction of the rotor inner core, and distance between the two groove side surfaces is smaller closer to the radially outer side.

7. The camshaft phase adjuster according to claim 6, wherein the valve seat comprises an outer frame, a portion of a surface of the outer frame forming a surface contact with the groove side surface of the valve mounting groove when the valve seat is installed into the valve mounting groove.

8. The camshaft phase adjuster according to claim 7, wherein the valve seat further comprises an intermediate stop portion partially separated from the outer frame, the intermediate stop portion having a spacing formed between a first stop portion surface near the valve plate and the groove bottom surface with the valve seat installed into the valve mounting groove, the spacing providing space for deformation movement of the valve plate.

9. The camshaft phase adjuster according to claim 8, wherein the first stop portion surface is a circular arc surface, the spacing being greater at a position closer to the second oil hole in the axial direction.

10. The camshaft phase adjuster according to claim 8, wherein with the valve seat installed into the valve mounting groove, the intermediate stop portion of the valve seat is projected in substantially a same shape as the movable portion of the valve plate in a plane perpendicular to the radial direction of the rotor inner core.

11. A camshaft phase adjuster, comprising:
a stator including a hollow stator body and a plurality of protrusions protruding radially inwardly on an inner side of the stator body,
a rotor including a rotor inner core having a substantially cylindrical shape and a plurality of rotor blades protruding toward a radially outer side of the rotor inner core,
the rotor being rotatably mounted in an inner space of the stator body, the plurality of protrusions defining a plurality of inner cavities by fitting with an outer peripheral wall of the rotor inner core, and one of the rotor blades extending into each of the inner cavities and defining a first chamber and a second chamber in the inner cavities,
a first oil hole, a second oil hole and a locking pin hole formed in the rotor inner core, the first oil hole being configured to connect an engine fluid passage and the first chamber, the second oil hole connecting the first chamber and the second chamber, the first oil hole and the second oil hole both passing through the locking pin hole;
a locking pin located in the locking pin hole and being switchable between a first position and a second position;
a one-way valve provided at the second oil hole; and
wherein, when the locking pin is in the first position, the first oil hole is unblocked, the one-way valve is switched off and the second oil hole is blocked, and when the locking pin is in the second position, the first oil hole is blocked by the locking pin, the one-way valve is switched on, and the second oil hole is unblocked.

12. The camshaft phase adjuster according to claim 11, further comprising a valve mounting groove formed in an outer periphery of the rotor inner core, the valve mounting groove connecting to the second oil hole, and the one-way valve being located in the valve mounting groove.

13. The camshaft phase adjuster according to claim 12, wherein the one-way valve comprises a valve plate and a valve seat, the valve plate being installed in the valve mounting groove, the valve seat being fixedly mounted in the valve mounting groove, and the valve seat being located on a radially outer side of the valve plate and limiting the valve plate in a radial direction of the rotor inner core.

14. The camshaft phase adjuster according to claim 13, wherein the valve mounting groove comprises a groove bottom surface extending along an axial direction of the rotor inner core and substantially perpendicular to the radial direction of the rotor inner core, two groove side surfaces located on either side of the groove bottom surface and extending along the axial direction of the rotor inner core, and an axial groove positioning surface, which is located between the first oil hole and the second oil hole in the axial direction of the rotor inner core.

15. The camshaft phase adjuster according to claim 14, wherein the valve plate comprises a fixed portion and a movable portion, one end of the movable portion being connected to the fixed portion and an other end of the movable portion being a stop-flow portion, which is configured to block the second oil hole by blocking an opening of the second oil hole at the groove bottom surface when the movable portion fits onto the groove bottom surface.

16. The camshaft phase adjuster according to claim 15, wherein the two groove side surfaces are inclined relative to the radial direction of the rotor inner core, and a distance between the two groove side surfaces is smaller closer to the radially outer side.

17. The camshaft phase adjuster according to claim 16, wherein the valve seat comprises an outer frame, a portion of a surface of the outer frame forming a surface contact with the groove side surface of the valve mounting groove with the valve seat installed into the valve mounting groove.

18. The camshaft phase adjuster according to claim 17, wherein the valve seat further comprises an intermediate stop portion partially separated from the outer frame, the intermediate stop portion having a spacing formed between a first stop portion surface near the valve plate and the groove bottom surface with the valve seat installed into the valve mounting groove, the spacing providing space for movement of the valve plate.

19. The camshaft phase adjuster according to claim 18, wherein the first stop portion surface is a circular arc surface, the spacing being greater at a position closer to the second oil hole in the axial direction.

20. The camshaft phase adjuster according to claim 18, wherein with the valve seat installed into the valve mounting groove, the intermediate stop portion of the valve seat is projected in substantially a same shape as the movable portion of the valve plate in a plane perpendicular to the radial direction of the rotor inner core.

* * * * *